United States Patent
Boehmer et al.

(10) Patent No.: US 6,761,411 B2
(45) Date of Patent: Jul. 13, 2004

(54) SEAT CUSHION WITH LOCKING SYSTEM

(75) Inventors: Michael Boehmer, Rockenhausen (DE); Michael Burr, Langwieden (DE); Gerhard Flory, Boeblingen (DE); Thomas Geisel, Rottenburg (DE); Daniel Hippel, Winnweiler (DE); Darius Wrobel, Keiserslautern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/378,714

(22) Filed: Mar. 4, 2003

(65) Prior Publication Data

US 2003/0214167 A1 Nov. 20, 2003

(30) Foreign Application Priority Data

Mar. 4, 2002 (DE) .......................... 102 09 240

(51) Int. Cl.[7] .............................. A47C 7/00; A47C 27/00
(52) U.S. Cl. ............................ 297/440.22; 297/452.59; 296/65.03
(58) Field of Search ................... 297/440.22, 440.2, 297/378.13, 15, 452.52, 452.59; 296/65.03; 248/222.11

(56) References Cited

U.S. PATENT DOCUMENTS

| | | | | |
|---|---|---|---|---|
| 4,032,191 A | * | 6/1977 | Fetsch | 297/440.22 |
| 4,583,782 A | * | 4/1986 | Mikuniya | 297/440.22 |
| 6,065,805 A | * | 5/2000 | Velimvassakis et al. | 296/65.03 |

FOREIGN PATENT DOCUMENTS

DE   195 24 174   6/1996

* cited by examiner

Primary Examiner—Anthony D. Barfield
(74) Attorney, Agent, or Firm—Kenyon & Kenyon

(57) ABSTRACT

In a seat cushion for a vehicle seat, the seat cushion is joined to a frame by a disengageable locking apparatus that has a wire spring engaging behind a mushroom head. The wire spring has two opposite limbs that at their one end are joined to one another and at their other end are open. In order to ensure a secure attachment, the two limbs of the wire spring may have at their open end an eye which engages behind a strut shaped onto the cushion shell.

9 Claims, 4 Drawing Sheets

SEAT CUSHION WITH LOCKING SYSTEM

CROSS-REFERENCE TO RELATED APPLICATIONS

The present application claims priority to Application No. 102 09 240.0, filed in the Federal Republic of Germany on Mar. 4, 2002, which is expressly incorporated herein in its entirety by reference thereto.

FIELD OF THE INVENTION

The present invention relates to a seat cushion.

BACKGROUND INFORMATION

Such seat cushions are principally used, in practice, in the back-seat area of vehicles, where space is limited and usually there is no installation space available for bolting the seat cushions to the vehicle. The seat cushion nevertheless needs to be immovably anchored and easy to install.

German Published Patent Application No. 195 24 174 describes a seat cushion that has a locking apparatus having a wire spring that coacts with a catch head. Upon assembly, the seat cushion locks automatically by the application of pressure from above onto the seat cushion, whereupon the wire spring is spread apart by the catch head and then engages in interlocking fashion behind it. A disadvantage with this apparatus is that the introduction of large forces can cause the wire spring to yield and bend. The risk then exists that it may come out of engagement with the catch head and release the seat cushion.

It is an object of the present invention to provide a seat cushion that may be easily installed and easily replaced, in which context the seat cushion may not accidentally come loose when large forces occur.

SUMMARY

The above and other beneficial objects of the present invention may be achieved by providing a seat cushion as described herein.

An example embodiment of a seat cushion has a locking apparatus having a two-limbed wire spring that engages behind a mushroom head. The two limbs of the wire spring are joined to one another at one end and open at the other end. The wire spring may be arranged, for example, from one piece of spring wire that is appropriately shaped. At the open end, the limbs of the wire spring each have an eye which, when the locking apparatus is locked, engages behind a strut shaped onto the cushion shell. The two limbs of the wire spring are fixed at both ends and may not move away from one another. At one end the limbs are joined to one another, and at the other end they are immobilized by the eyes that are in engagement with the cushion shell. As a result, in the locked position the wire spring may always be in engagement with the mushroom head. The locking apparatus may thus remain securely locked even when large forces are introduced.

To allow easy replacement of the seat cushion, provision may be made for the locking apparatus to be arranged disengageably. It has a manual actuation element that is joined to the wire spring, e.g., retains the joined end of the wire spring. The actuation element transfers the pressure introduced by manual actuation directly to the wire spring and forces it in the opening direction.

An example embodiment provides for the spring to be arranged in approximately a U-shape, the limbs of the wire spring being shaped and/or positioned as mirror images of one another. Each limb may have at least one obliquely extending segment that coacts with an oblique guidance surface, e.g., a spreader element. When the wire spring is acted upon in the opening direction, it moves linearly along the oblique guidance surface, is spread as a result of the obliquely shaped limb segments, and comes out of engagement with the mushroom head.

An example embodiment provides for the wire spring to have a spring tension that moves the two limbs toward one another. By coaction of the spreader wedges and the oblique segments of the spring limbs, the spring tension forces the wire spring in the closing direction, so that the locking apparatus automatically locks.

A further example embodiment provides for the strut beneath which the eye engages to be arranged as a spreader wedge. The strut may have on one side a pocket and/or a groove into which the eye engages. The other side of the strut may be arranged as an oblique surface that is in contact with, and guides, an oblique segment of the limb of the wire spring.

To ensure easy actuation of the locking apparatus on the one hand and secure retention of the seat cushion on the other hand, provision may be made for each limb of the wire spring to have at least two oblique segments. A first oblique segment is positioned before the mushroom head and a second after the mushroom head, in order to immobilize the wire spring on both sides of the mushroom head. The oblique segments may be arranged such that they at least partially wrap around the wire spring and thus guide and retain it.

Provision may be made for use of the seat cushion according to the present invention in bench seats and individual seats in the back-seat area of a vehicle and/or in individual seats e.g., in buses or rail vehicles or aircraft, etc.

Further aspects and example embodiments of the present invention are described below with reference to the Figures. The features and feature combinations described above and described below are usable not only in the particular combination indicated but also in other combinations or in isolation, without departing from the scope of the present invention.

Further example embodiments of the present invention are depicted and explained in the Figures.

DETAILED DESCRIPTION

Figure 1:
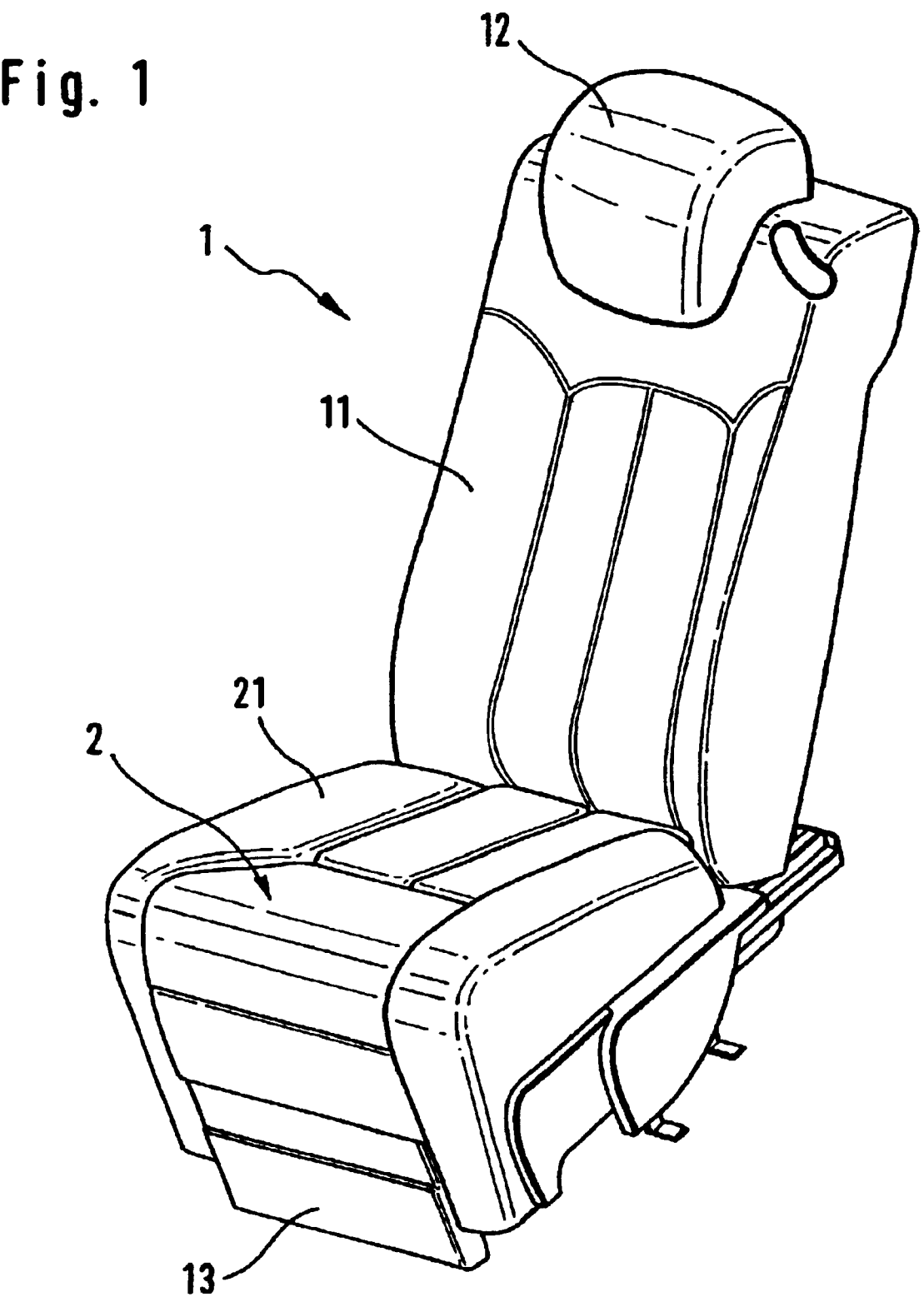
FIG. 1 illustrates a vehicle seat with seatback and seat cushion.

FIG. 1 illustrates a vehicle seat 1 as used, for example, in the back-seat area of a vehicle. Vehicle seat 1 has a seatback 11 having a headrest 12, as well as a seat cushion 2. For comfortable seating capability, the vehicle seat also has a footrest 13. Vehicle seat 1 is moreover mounted in the vehicle in longitudinally displaceable fashion by rails. Seatback 11 is arranged pivotably, so that the seat exhibits a number of possible seating variants. For example, it may be brought from an upright seat position into a tilted-back resting position.

Figure 2:
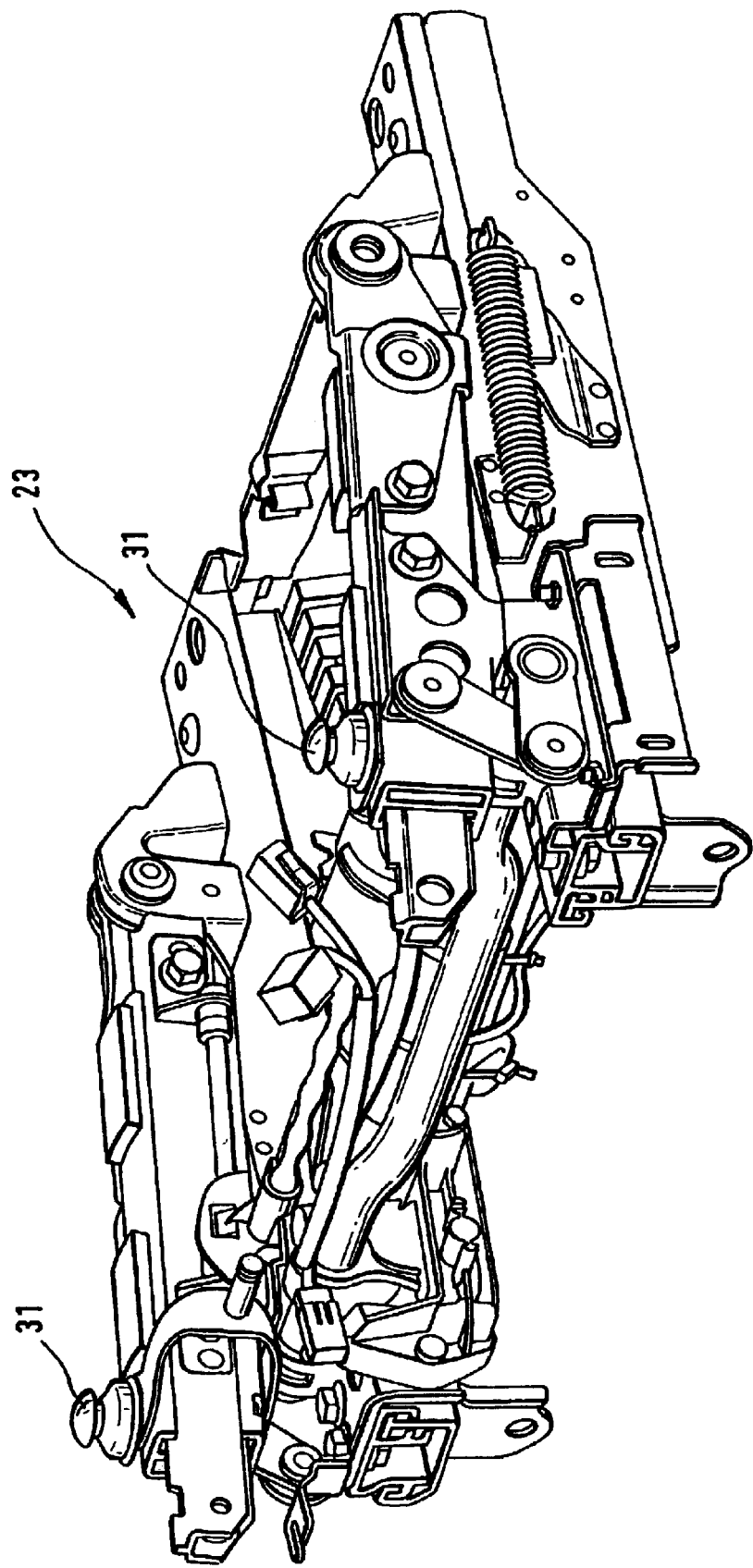
FIG. 2 illustrates a seat cushion frame without the seat pad.

Seat cushion 2 has a cushion shell 22 that supports a seat pad 21. The seat cushion is joined via cushion shell 22 to a frame 23 that is illustrated in FIG. 2. Frame 23 supports the seat cushion and has adjustment elements for setting the seat position.

A locking apparatus 3 holds seat cushion 2 on frame 23. Upon installation, seat cushion 2 is slid, with a fork positioned in the rear region of seat cushion 2, onto a stationary stud 41 and then pushed or pivoted downward so that locking apparatus 3 snaps into place and holds seat cushion 2.

Seat cushion 2 has two locking apparatuses 3, one locking apparatus being positioned on each side of seat cushion 2 so that seat cushion 2 is securely joined to frame 23.

Figure 3:
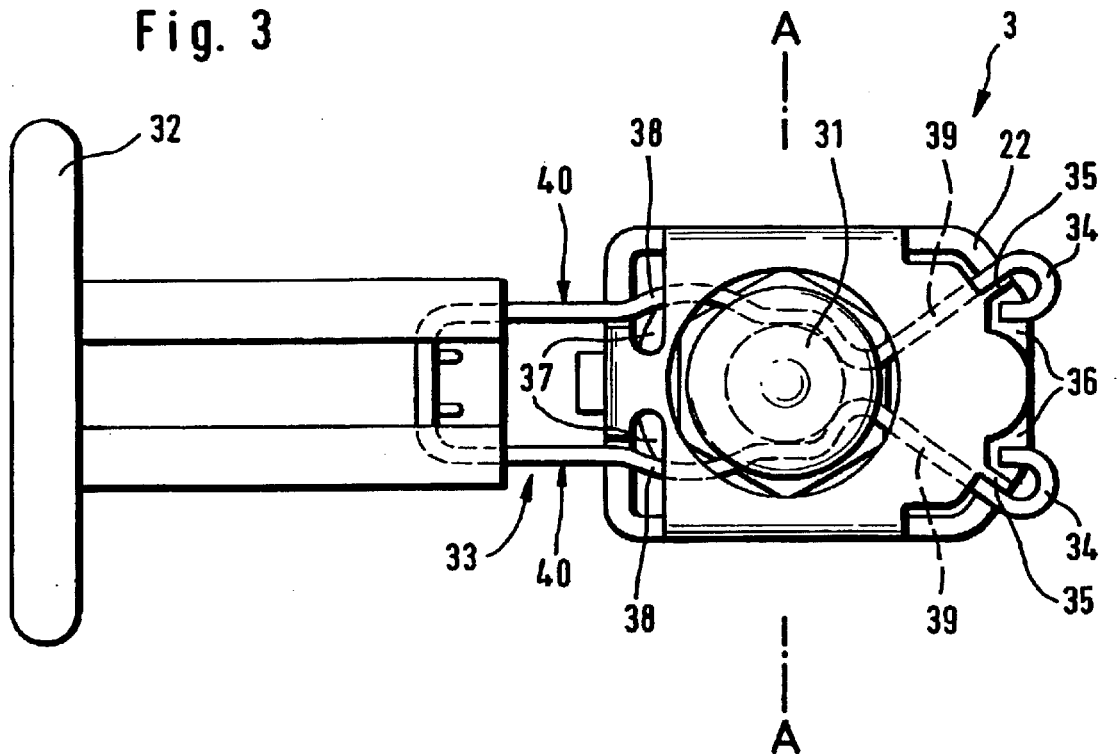
FIG. 3 illustrates the locked locking apparatus.
Figure 4:
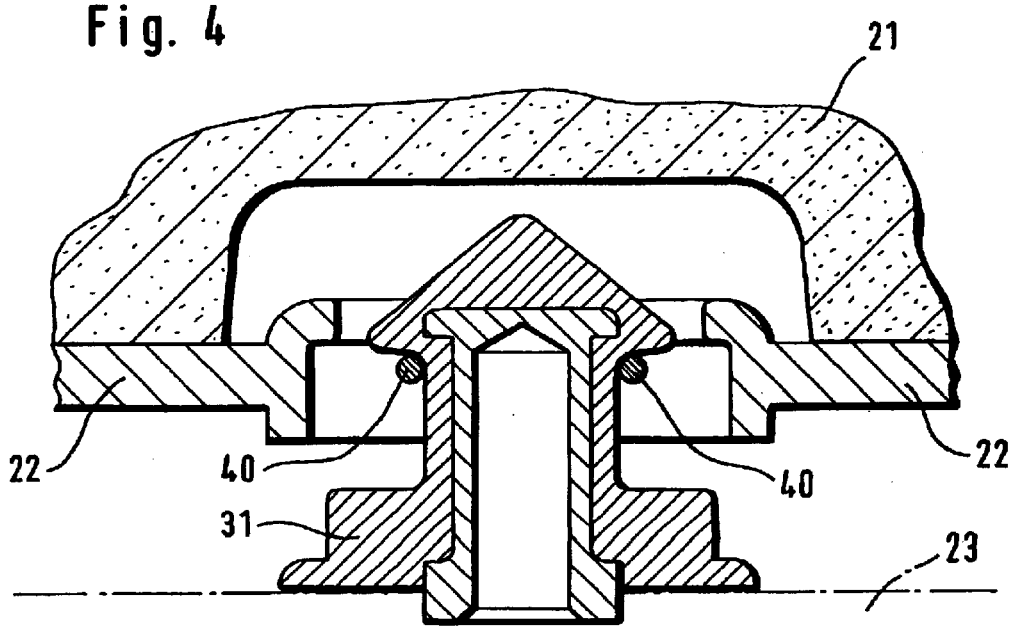
FIG. 4 is a cross-sectional view taken along line A—A illustrated in FIG. 3.

FIG. 3 illustrates locking apparatus 3 in the engaged or locked position. FIG. 4 is a cross-sectional view taken along line A—A.

Locking apparatus 3 has a mushroom head 31 that is immovably joined to frame 23. The mushroom head has an upper part which tapers to a point, and which is undercut and transitions into a foot part that widens toward the bottom. The wide foot part is joined nonpositively to frame 23. Mushroom head 31 coacts with a wire spring 33 that is joined to cushion shell 22. Seat pad 21 is positioned above the cushion shell. Cushion shell 22 is arranged as a shaped part made of aluminum, steel, plastic, etc., and has guides on which wire spring 33 is displaceably mounted.

Wire spring 33 is bent out of one piece of spring wire and is approximately U-shaped. Two limbs 40 of wire spring 33, extending parallel, are joined to one another at one end and are open at the other end. In the locked position, wire spring 33 is in engagement with mushroom head 31. The two limbs 40 engage diametrically behind the mushroom head. Wire spring 33 has a spring preload that forces limbs 40 toward one another, which may ensure engagement behind mushroom head 31. The joined end of wire spring 33 engages into an actuation element 32 and is attached there, e.g., adhesively bonded, encapsulated, welded, etc.

Actuation element 32 is guided on cushion shell 22 and has a pressure surface accessible from outside seat cushion 2. In order to disengage locking apparatus 3, pressure may be exerted manually on actuation element 32, whereupon the latter impinges upon wire spring 33 in the opening direction.

Figure 5:
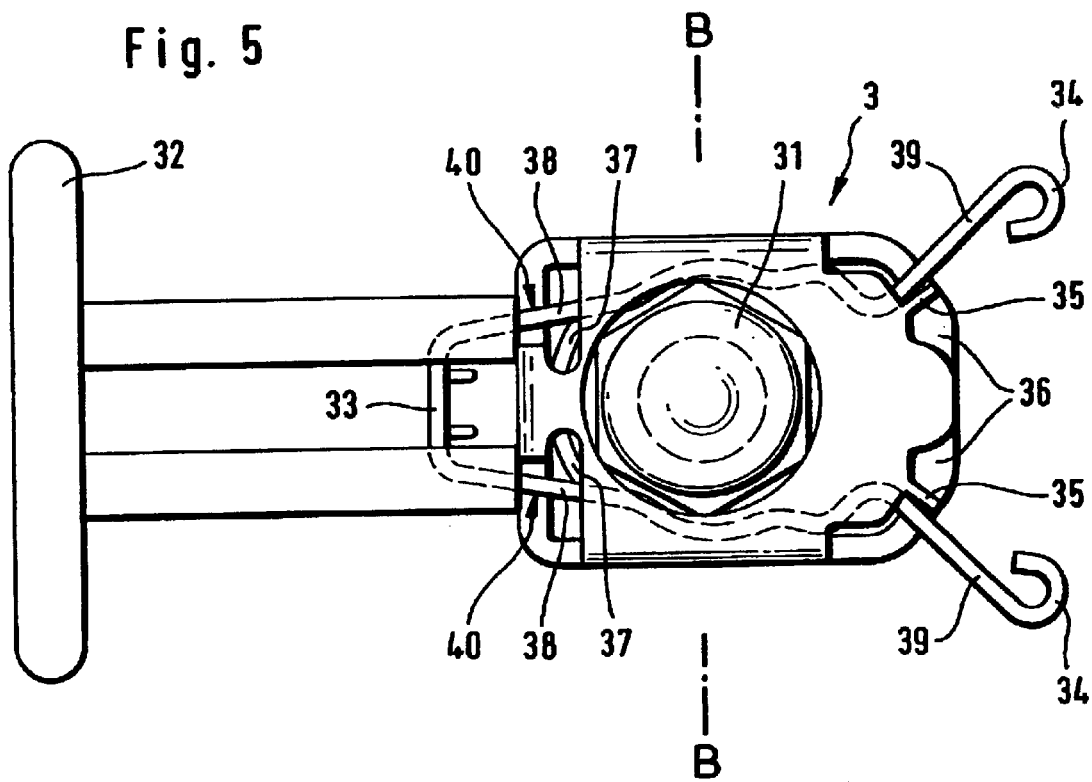
FIG. 5 illustrates the unlocked locking apparatus.
Figure 6:
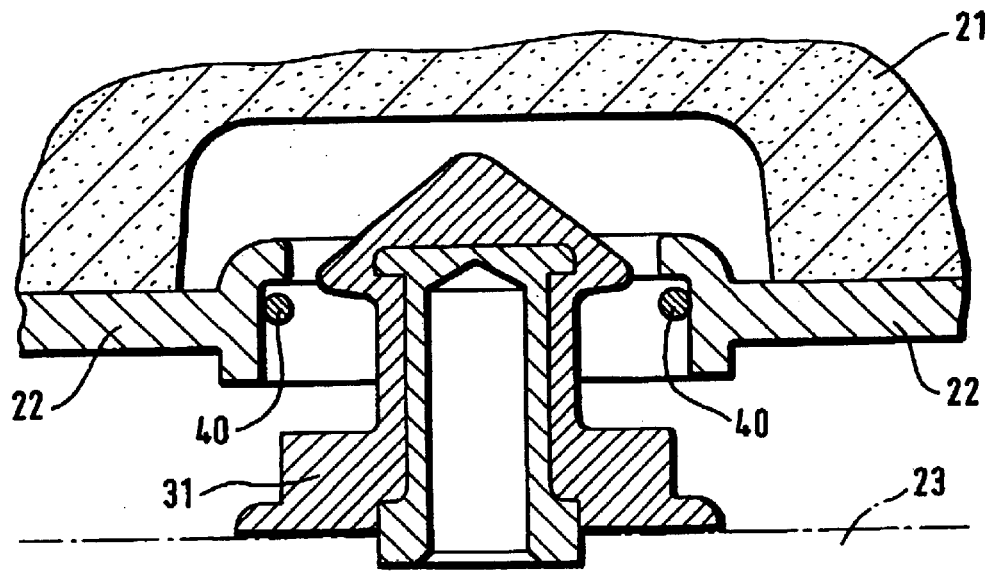
FIG. 6 is a cross-sectional view taken along line B—B illustrated in FIG. 5.

The unlocked locking apparatus, with the wire spring spread apart and out of engagement with the mushroom head, is illustrated in FIG. 5 and FIG. 6. Each limb 40 of wire spring 33 has an obliquely shaped segment 39 which coacts with spreader element 35 so that limbs 40 are spread as wire spring 33 moves in the opening direction. Cushion shell 22 has stops, coacting with actuation element 32, that limit the opening motion when locking apparatus 3 is unlocked. When locking apparatus 3 is unlocked, seat cushion 2 may easily be folded upward and/or removed.

The spring tension of wire spring 33 forces limbs 40 toward one another. As a result, the oblique segments of limb 40 are braced against spreader element 35 and drive wire spring 33 in the locked direction. Locking apparatus 3 therefore may lock itself automatically after actuation element 32 is released.

Limbs 40 of wire spring 33 each have, at their free end, an eye 34 that, when locking apparatus 3 is locked, engages behind cushion shell 22 or a strut 35 of cushion shell 22. Eye 34 engages into a pocket 36 shaped on the cushion shell and thus may prevent limbs 40 from unintentionally spreading apart at the free end of wire spring 33. Limbs 40 of wire spring 33 may thus be immovably retained at both ends. Locking apparatus 3 may thus be disengaged only by actuation of actuation element 32.

What is claimed is:

1. A seat cushion for a vehicle seat, comprising:
   a disengageable locking apparatus;
   a cushion shell including a seat pad and a strut shaped onto the cushion shell; and
   a frame arranged to support the cushion shell and joined to the cushion shell by the locking apparatus;
   wherein the locking apparatus includes a mushroom head joined immovably to the frame and a wire spring joined to the cushion shell, the wire spring including two opposite limbs joined at one end to one another and open at another end, the limbs arranged to engage behind the mushroom head when the locking apparatus is locked, each limb including an eye arranged at the open end and arranged to engage the strut shaped onto the cushion shell when the locking apparatus is locked.

2. The seat cushion according to claim 1, wherein the locking apparatus includes a manual actuation element configured to disengage the locking apparatus, the joined ends of the limbs of the wire spring arranged to engage into the actuation element and are attached to the actuation element.

3. The seat cushion according to claim 1, wherein the limbs of the wire spring are arranged as mirror images of each other.

4. The seat cushion according to claim 3, wherein one limb includes two segments that extend obliquely in a same direction so that when the locking apparatus is locked, a first segment is positioned before the mushroom head and a second segment is positioned after the mushroom head.

5. The seat cushion according to claim 4, wherein one of the segments is configured to coact with a spreader element shaped on the cushion shell.

6. The seat cushion according to claim 5, wherein the locking apparatus is self-locking, a spring tension of the wire spring configured to force the two limbs toward one another, the wire spring configured to drive the limb into a locked position in accordance with coaction of the spreader element and the segment.

7. The seat cushion according to claim 4, wherein one of the segments coacts and is in contact with a spreader element shaped on the cushion shell.

8. The seat cushion according to claim 7, wherein the actuation element is configured so that, when pressed, the actuation element moves the wire spring linearly along the spreader element and, in accordance with coaction of the spreader element and the segment of the limbs, spreads the wire spring and brings the wire spring out of engagement with the mushroom head.

9. The seat cushion according to claim 1, wherein the strut is arranged as a spreader element configured to coact on one side with the eye and including on another side an oblique contact surface configured to guide the limb of the wire spring.

* * * * *